United States Patent
Knopf et al.

(10) Patent No.: US 8,985,710 B2
(45) Date of Patent: Mar. 24, 2015

(54) FLANGED BEARING RING FOR THE HUB OF A MOTOR VEHICLE WHEEL

(75) Inventors: Andreas Knopf, Würzburg (DE); Paolo Re, Nichelino (IT)

(73) Assignee: Aktiebolaget SKF, Gothenburg (SE)

( * ) Notice: Subject to any disclaimer, the term of this patent is extended or adjusted under 35 U.S.C. 154(b) by 548 days.

(21) Appl. No.: 13/426,806

(22) Filed: Mar. 22, 2012

(65) Prior Publication Data

US 2012/0248859 A1  Oct. 4, 2012

(30) Foreign Application Priority Data

Mar. 29, 2011 (IT) .............................. TO2011A0279

(51) Int. Cl.
*B60B 27/00* (2006.01)
*B22D 19/04* (2006.01)
*F16C 33/64* (2006.01)
*F16C 33/60* (2006.01)
*F16C 19/18* (2006.01)

(52) U.S. Cl.
CPC ............ *B60B 27/0005* (2013.01); *B22D 19/04* (2013.01); *B60B 27/0073* (2013.01); *F16C 33/64* (2013.01); *F16C 33/60* (2013.01); *B60B 2360/102* (2013.01); *B60B 2360/104* (2013.01); *B60B 2360/32* (2013.01); *B60B 2900/5114* (2013.01); *B60Y 2200/11* (2013.01); *F16C 2326/02* (2013.01); *F16C 19/184* (2013.01)
USPC ........................................................ 301/109

(58) Field of Classification Search
CPC ... B60B 27/007; B60B 27/0094; F16C 33/60; F16C 33/605; F16C 33/64; F16C 33/72; F16C 33/768
USPC ............ 301/105.1, 109, 110, 110.6; 384/492, 384/515, 544, 564
See application file for complete search history.

(56) References Cited

U.S. PATENT DOCUMENTS

| 4,715,780 | A  | * | 12/1987 | Kan .............................. 415/200 |
| 6,866,422 | B2 | * | 3/2005  | Griseri et al. ................. 384/537 |
| 2005/0163410 | A1 | * | 7/2005 | Sakamoto ..................... 384/544 |
| 2010/0021099 | A1 | * | 1/2010 | Torii ............................ 384/544 |

FOREIGN PATENT DOCUMENTS

| EP | 0297552 A2 | 1/1989 |
| WO | WO2008147284 A1 | 12/2008 |
| WO | WO2010063299 A1 | 6/2010 |

* cited by examiner

*Primary Examiner* — S. Joseph Morano
*Assistant Examiner* — Jean Charleston
(74) *Attorney, Agent, or Firm* — Bryan Peckjian; SKF USA Inc. Patent Dept.

(57) ABSTRACT

A flanged bearing ring (10) for the wheel of a motor vehicle includes a tubular core (15) and an outer body (16) around the core. The core (15) and the outer body are made of two different materials and joined as a single piece. The outer body forms a radial flange (17) and is made of a lighter material than that of the core. At both axial ends of the ring, the radially outer surface of the core provides a succession of depressions (27) and ridges (28) which extend in a circumferential direction, and cause the formation of complementary recesses and reliefs in the outer body (16). This results in a long meander-like path that opposes or at least delays the entrance of contaminant or corrosive agents between the outer body (16) and the core (15).

6 Claims, 1 Drawing Sheet

FLANGED BEARING RING FOR THE HUB OF A MOTOR VEHICLE WHEEL

CROSS-REFERENCE TO RELATED APPLICATION

This U.S. Non-Provisional Utility application claims the benefit of copending Italy Provisional Patent Application Serial No. TO2011A000279, filed on 29 Mar. 2011, which is incorporated herein in its entirety.

FIELD OF THE INVENTION

The present invention relates to a lightweight, flanged bearing ring for the hub of a motor vehicle wheel, particularly a rotatable ring with a flange providing connection to the wheel and/or the brake rotor.

SUMMARY OF THE INVENTION

The motorcar industry has to comply with an ever increasing demand for weight reduction in motor vehicle components for the sake of cutting down fuel consumption and exhaust emissions. With a vehicle wheel bearing, weight reduction may not imply any reduction in strength and safety. The raceways must be made of a material hard enough to resist the stresses of rolling contact; for this purpose, in the vast majority of cases, the raceways are made of a bearing grade steel. The raceways are heat treated so as to attain a level of hardness and microstructure homogeneity adequate to withstand the stresses caused by rolling Hertzian contact.

Recent flanged bearing rings include a radially inner, annular or tubular insert (or core) made of bearing steel and forming one or two raceways, and a radially outer body forming a radially outwardly extending flange around the insert and made of a lightweight material such as aluminium alloy. The lightweight flange is designed to be connected to the wheel and/or the brake rotor and transfer loads from these components to the tubular insert.

WO 2008/147284 A1 discloses a bearing ring made up of two different materials joined together in a single piece, namely a first, high toughness material such as bearing steel forming the raceways and a second, lightweight material, such as a lightweight metal, forming the rest of the ring. The second material is joined to the first material by a semi-solid casting process.

It has been observed that, with bearing rings of the above type, a weak point is given by the area where the interface surface between the two parts of different materials (tubular steel core, outer body of lightweight material) opens on the axially outer side, or outboard side of the bearing. In working conditions, micro-cracks tend inevitably to open along the interface surface between the two different materials tend inevitably to form.

In working conditions, the loads coming from the wheel transmit to the flange of the light-alloy outer body a bending moment which tends to separate the outer body from the core. Furthermore, repeated cycles of thermal stresses cause a differential thermal expansion between the outer body made of aluminum and the steel core, which has a coefficient of thermal expansion lesser than that of aluminum alloys. The infiltration of contaminants such as water, dust, salt, over time causes micro-cracks to broaden and the formation of rust. Experimental tests carried out by the Applicant have shown the occurrence of problems of galvanic corrosion with the use of certain types of light alloy, having a considerable difference in electrochemical potential than the steel. Salt, or even more simply water, can in fact be an electrolytic means having a high capability of penetration in openings. Because of all these factors, there is a risk that the coupling between the outer body of light alloy and steel core deteriorates, resulting in fretting (sliding) and possibly failure of the flanged ring.

It is an object of the invention to provide a bearing ring made of two parts of different materials coupled together in a reliable, long-lasting ad watertight manner, so as to overcome the inconveniences of above-mentioned state of the art.

The above and further objects and advantages are attained, in accordance with the invention, by a flanged bearing ring having the features set forth in claim 1. Preferred embodiments of the invention are defined in the dependent claims.

BRIEF DESCRIPTION OF THE DRAWINGS

There will now be described a preferred embodiment, given by way of example, reference being made to the accompanying drawings, in which.

DETAILED DESCRIPTION OF THE INVENTION

Figure 1:
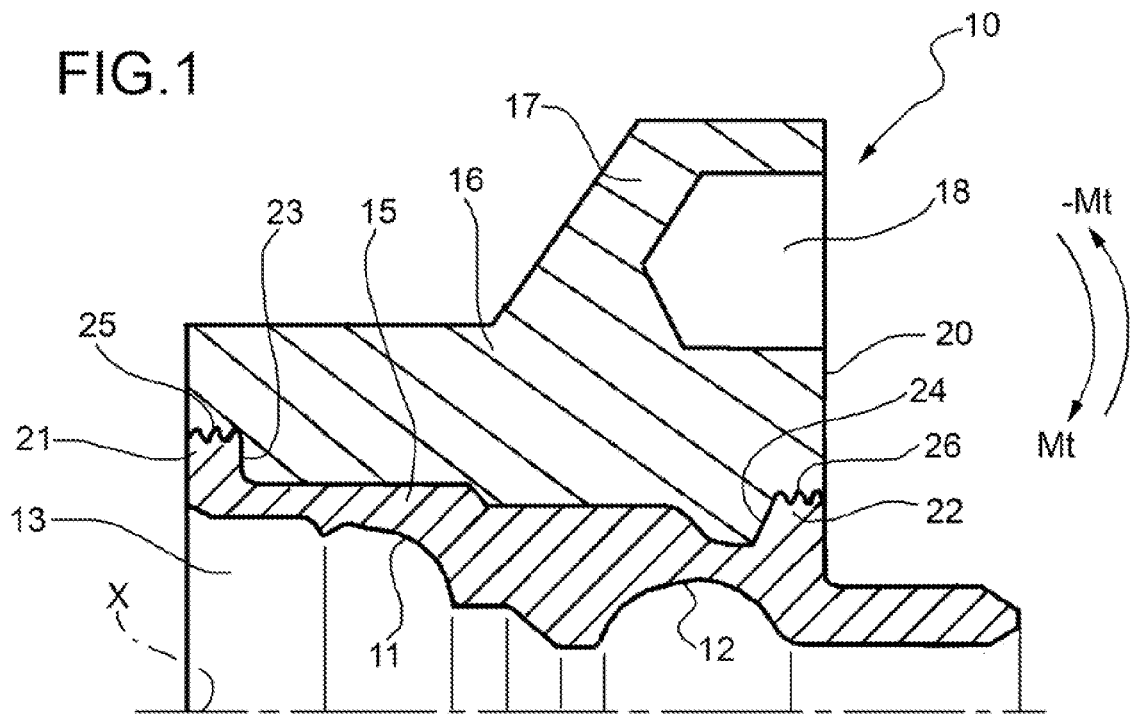
FIG. 1 is a partial axial cross-sectional view of a flanged bearing ring according to an embodiment the invention.

Referring initially to FIG. 1, designated overall at 10 is a flanged bearing ring in accordance with an embodiment of the invention. The ring 10, in this example, is designed to be the outer, rotatable ring of a double-row angular contact ball bearing for vehicle applications, particularly for mounting to a vehicle wheel (not shown) to be rotationally supported relative to a stationary suspension standard (not shown) of the vehicle around a central axis of rotation x. Throughout the present description and the claims, terms and expressions indicating positions and directions such as "radial" and "axial" are understood as referring to the axis of rotation x of the bearing. Expressions such as "axially inner" and "axially outer" instead refer to a condition when mounted on a vehicle.

The ring 10 comprises a radially inner insert or core 15 of a generally tubular shape and a radially outer body 16 providing a radially outwardly extending flange 17 at the outboard side of the core 15. The flange 17 provides a number of bores 18 to allow connection to the vehicle wheel by means of stud bolts (not shown). The flange 17 has a axially outer flat radial surface 20 defining a precise reference surface against which the wheel or brake disc is intended to rest.

The core 15 forms an axially extending inner cavity 13, in which two raceways 11, 12 are obtained and is made of a first, hard and tough material, preferably a bearing grade steel. The radially outer body 16 is made of a second, lightweight material. A lightweight metal is preferred, such as aluminium, magnesium, or alloys thereof. Other suitable materials for the outer body may include, but not be limited to, carbon composites or reinforced polymers.

The outer body 16 is formed around the core 15 in a number of different ways, for example through a semi-solid casting process, or by sintering or casting, or die-casting. At the end of any of these processes, the lightweight material tightly copies the shape of the radially outboard surface of core 15, whereby the inner and outer bodies interlock with one another. The shape of the radially outboard surface of the core 15 is so formed as to provide a series of grooves and ridges which extend in the circumferential direction and determine the formation of complementary ridges and grooves in the outer body when this is formed around the core. In order to provide adequate structural support to the outer body 16, the steel core 15 extends axially through the whole width of the outer body.

At either axial end, the core 15 forms a respective shoulder 21, 22, projecting in a radially outer direction and extending in a circumferential direction. The shoulders 21, 22 serve to oppose relative axial displacement between the outer body 16 and the core 15, particularly when the hub is subjected to thermal loads and tilting moments. Thermal stresses, in fact, cause differentiated thermal expansions between the lightweight material of the outer body 16 and the high toughness material of the inner core 15. The static and dynamic loads applied to the flanged bearing ring which are more critical for the stable union of the bodies 15 and 16 are illustrated schematically in FIG. 1. In use, the flanged bearing ring is subjected to tilting moments Mt and −Mt applied by the associated components (wheel, brake rotor, not shown) and transferred to the bearing balls through the flanged bearing ring 10.

The shoulders 21, 22 serve to effectively counteract the above-mentioned stresses, generating reaction forces that are transmitted mainly through the sides 23, 24 of each shoulder. These sides extend in radial directions (such as the side 23 of the shoulder 21 on the axially inner side), or may be conical, tapering towards the center of the ring, such as the side 24 of the shoulder 22 located on the axially outer side of the ring.

Figure 2:
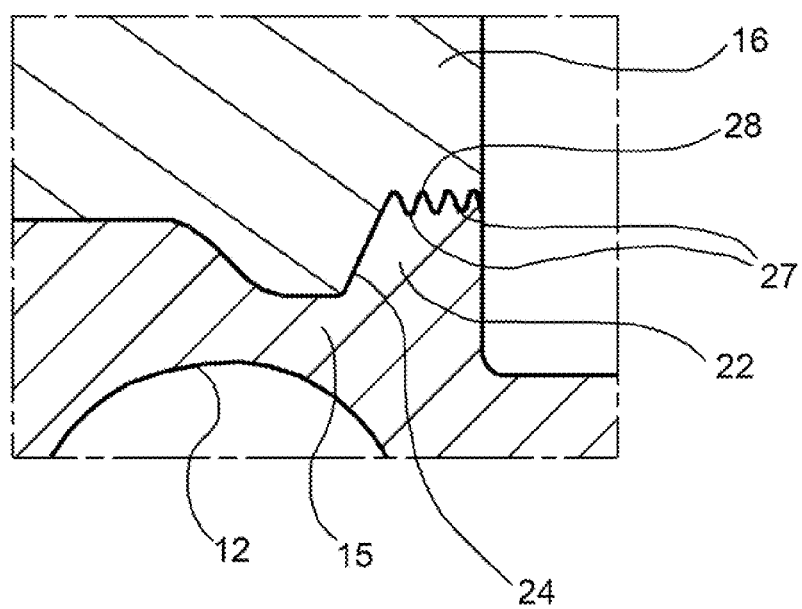
FIG. 2 is an enlarged view of a detail of the bearing ring of FIG. 1.

As shown more clearly in FIG. 2, the shoulders 21, 22 each provide a respective radially outer surface 25, 26 which forms a succession of depressions 27 and ridges 28 consecutive in the axial direction, whose purpose is to create a meander-like or wave-like path, when viewed in axial cross-section. Such a path which should be as long as possible to create a labyrinth that opposes or at least delays the entrance of contaminant or corrosive agents (dust, water, debris, electrolytic solutions, corrosive elements, etc.) that could over time result in loss of functionality of the locking between the outer body and the inner core. The depressions and ridges can be implements for example in the form of threads, that is, spiralling, or as parallel circular depressions and ridges.

It will be appreciated that the sealing effect provided by the ridges and depressions is obtained without the addition or interposition of layers of elastomeric material or other sealing elements

What we claim is:

1. A flanged bearing ring for a motor vehicle wheel, the ring (10) including two different materials joined together as a single piece, the ring comprising:
   a radially inner tubular or annular core (15) which forms at least one raceway (11) around a central axis of rotation (x), the core (15) providing a radially outer surface, and being made of a first, hardened material;
   a radially outer body (16) which is formed around said outer surface of the core (15), forms a radially outwardly extending flange (17) around the core, and is made of a second material being softer than the first material;
   wherein the core (15) extends axially across the entire width of the outer body, and the radially outer surface of the core (15) provides a series of reliefs and recesses extending in a circumferential direction, and determining the formation of complementary recesses and reliefs in the outer body (16); and wherein
   the complementary recesses and reliefs include, at both axial ends of the ring (10), a respective succession of depressions (27) and ridges (28) which are consecutive in the axial direction, thereby determining an elongate meander-like path that opposes or at least delays the entry of contaminants or corrosive agents between the outer body (16) and the core (15).

2. The flanged ring according to claim 1, wherein the succession of depressions (27) and ridges (28) are formed on two shoulders (21, 22) protruding in radially outer directions and extending in circumferential directions from the two opposite axial ends the core (15).

3. The flanged ring according to claim 2, wherein the successions of depressions (27) and ridges (28) are provided by respective radially outer surfaces (25, 26) of the shoulders (21, 22).

4. The flanged ring according to claim 1, wherein the depressions and ridges are shaped as parallel circular depressions and ridges.

5. The flanged ring according to claim 1, wherein the depressions and ridges are shaped as a spiral thread.

6. A flanged ring according to claim 2, wherein the shoulders (21, 22) each have a respective side (23, 24) that faces the middle of the ring (10) and extends in a substantially radial direction or according to a conical surface tapering towards the center of the ring (10).

* * * * *